United States Patent
Xu

(10) Patent No.: US 10,562,571 B2
(45) Date of Patent: Feb. 18, 2020

(54) DOUBLE-BEND DOUBLE-GIRDER STRUCTURE FOR SCOOTERS

(71) Applicant: HENGDIAN GROUP INNUOVO ELECTRIC CO., LTD., Dongyang, Zhejiang Province (CN)

(72) Inventor: Tianbo Xu, Dongyang (CN)

(73) Assignee: HENGDIAN GROUP INNUOVO ELECTRIC CO., LTD., Dongyang (CN)

( * ) Notice: Subject to any disclaimer, the term of this patent is extended or adjusted under 35 U.S.C. 154(b) by 132 days.

(21) Appl. No.: 15/871,917

(22) Filed: Jan. 15, 2018

(65) Prior Publication Data

US 2019/0118866 A1 Apr. 25, 2019

(30) Foreign Application Priority Data

Oct. 20, 2017 (CN) .......................... 2017 1 0982104

(51) Int. Cl.
*B62D 21/18* (2006.01)
*B62D 7/16* (2006.01)

(52) U.S. Cl.
CPC ............... *B62D 21/18* (2013.01); *B62D 7/16* (2013.01)

(58) Field of Classification Search
CPC ............. B62D 21/18; B62D 7/16; A61G 5/04
See application file for complete search history.

(56) References Cited

U.S. PATENT DOCUMENTS

| | | | |
|---|---|---|---|
| 2004/0124032 A1* | 7/2004 | Iizuka | B62K 25/00 180/311 |
| 2007/0176384 A1* | 8/2007 | Brudeli | B60G 21/007 280/124.103 |
| 2007/0296196 A1* | 12/2007 | Poglavec | B62K 5/01 280/785 |
| 2008/0185206 A1* | 8/2008 | Nieman | B62K 11/02 180/227 |
| 2016/0368340 A1* | 12/2016 | Nolin | B62K 25/283 |
| 2017/0259875 A1* | 9/2017 | Chang | B62K 5/01 |
| 2017/0282987 A1* | 10/2017 | Koishikawa | B62J 1/08 |

* cited by examiner

*Primary Examiner* — Darlene P Condra
(74) *Attorney, Agent, or Firm* — Jiwen Chen

(57) ABSTRACT

The present invention discloses a double-bend double-girder structure for a scooter. A frame comprises a frame body; at a front end of the frame body, two girders arranged longitudinally in a front-rear direction, a mandrel arranged transversely in a left-right direction and fixed to the girders, and a tiller arranged vertically are provided; one shock absorber is fixed to each of left and right ends of the mandrel, and a lower end of the shock absorber is fixed to a front wheel bar, an outer end of which is fixed to a front wheel; and each of the girders consists of a front girder segment, a middle girder segment and a rear girder segment, the front girder segment being relatively located above the rear girder segment, and the middle girder segment being arranged between the front girder segment and the rear girder segment. The present invention has the advantages that the structural strength of the frame is increased, the concentration points of stress are reduced, the service life of the scooter is increased, the structure of the scooter frame is simplified, the stress distribution of the shock absorption system is optimized, and the comfort during the use of the scooter of the present invention is improved.

10 Claims, 3 Drawing Sheets

DOUBLE-BEND DOUBLE-GIRDER STRUCTURE FOR SCOOTERS

This application claims the priority benefit of Chinese Application No. 201710982104.0, filed Oct. 20, 2017, which is hereby incorporated by reference.

TECHNICAL FIELD OF THE INVENTION

The present invention relates to a frame structure for a scooter and in particular to a double-bend double-girder structure for a scooter.

BACKGROUND OF THE INVENTION

The frame of an existing scooter designed especially for the senior people has one girder arranged longitudinally; one side beam is provided on each of left and right sides of the girder, with a plurality of connecting beams fixed between the girder and the side beams; the tiller is directly fixed on the girder; and the mandrel of the front suspended shock absorption system of the scooter is also fixed to the front end of the girder. Consequently, there are many concentration points of stress on the frame of the scooter, the strength of the frame of the scooter is low, the leverage factor in the torque transfer from the front suspended shock absorption system to the frame is large, and the shock absorption effect is low.

In order to ensure the strength of the frame of the scooter, various kinds of reinforcing plates will be additionally provided at the front end of the scooter. As a result, the front end of the frame of the scooter will be large in volume, complicated in structure and more cumbersome. This is not disadvantageous to the production, sale and use of scooters.

SUMMARY OF THE INVENTION

An object of the present invention is to provide a double-bend double-girder structure for a scooter, by which the structural strength of the frame is increased, the concentration points of stress are reduced, the service life of the scooter is increased, the structure of the scooter frame is simplified, the stress distribution of the shock absorption system is optimized, and the comfort during the use of the scooter of the present invention is improved.

For this purpose, the present invention employs the following technical solution. a double-bend double-girder structure for a scooter is provided; a frame includes a frame body; at a front end of the frame body, two girders arranged longitudinally in a front-rear direction, a mandrel arranged transversely in a left-right direction and fixed to the girders, and a tiller arranged vertically are provided; one shock absorber is fixed to each of left and right ends of the mandrel, and a lower end of the shock absorber is fixed to a front wheel bar, an outer end of which is fixed to a front wheel; and each of the girders consists of a front girder segment, a middle girder segment and a rear girder segment, the front girder segment being relatively located above the rear girder segment, and the middle girder segment being arranged between the front girder segment and the rear girder segment.

With the double-girder structure in the present invention, the structural strength of the frame can be increased, the concentration points of stress can be reduced, and the service life of the frame of the scooter can be increased. The height of both the front girder segments of the two girders is higher than the height of the rear girder segments. The mandrel can be fixed on the front girder segment to leave a space for mounting a shock absorber on the lower side of the mandrel. In this way, the structure of the front suspended shock absorption system can become simpler and the volume of the front end of the frame can be reduced. The tiller of the front wheel steering system of the scooter can be fixed to the girder and also to the mandrel.

Preferably, the middle girder segment is arranged in an arc shape so that the girder forms an S-shaped structure. The double-bend S-shaped structure can realize the rational utilization of the frame space, to leave an enough space for the front wheel steering system and the front suspended shock absorption system. Compared with the use of a single-bend girder, the use of two double-bend girders in the present invention is more disadvantageous to the design of the frame and the frame cover. The space for receiving feet of the user in the scooter is better optimized, and the comfort of the user is thus improved. An S-shaped girder can be obtained by a bending device, and there is no welding point between the front girder segment, the middle girder segment and the rear girder segment, so that the strength of the frame is increased.

Preferably, the mandrel is fixed above a front girder segment of a girder and the mandrel is deviated from a front end of the front girder segment; a connecting bar is fixed between front ends of two front girder segments; the rudder stock is fixed to the middle portion of the connecting bar; and a steering shaft is provided within the rudder stock to steer a front wheel, and a lower end of the steering shaft passes through the connecting bar to extend to below a lower end face of the connecting bar. The front end of the frame in the present invention takes a cage structure which can avoid the stress concentration on a single point, so that the structure of the frame can be more stable. A via hole can be directly drilled on the mandrel to place and fix the tiller. Therefore the precision after the fixation of the tiller will be better. An operating bibcock is fixed at an upper end of the steering shaft, and a lower end of the steering shaft is linked to the front wheel via a linkage mechanism.

Preferably, the frame body includes one main beam arranged longitudinally in a front-rear direction and side beams located on left and right sides of the main beam, with a plurality of connecting beams fixed between the side beams and the main beam; a main crossbeam is fixed at a front end of the main beam; a rear end of the rear girder segment is fixed to a connecting beam; and left and right ends of the main crossbeam are fixed to the rear girder segment of a girder, respectively. The short length of the girder in the front-rear direction in the present invention is more convenient for manufacturing and machining. During the practical machining, it is difficult to ensure the bending precision. In the present invention, by reducing the length of the girder, the residue after the use of the girder is reduced, and thus, the loss is reduced and the production cost is reduced.

Preferably, a front end of each of the side beams is bent and extended inward to form a front side beam segment, an end of the front side beam segment away from the side beam is fixed to the rear girder segment, and an arc-shaped bent structure is formed between the front side beam segment and the side beam. This arrangement deletes the concentration points of stress at the front end of the side beam and increases the service life of the frame. Since the front end of the side beam of the existing frame is welded to the connecting beam and there are concentration points of stress formed at the weld between the front end of the side beam and the connecting beam, fatigue facture may occur at the weld because no stress can be released at the side beam. As a result, the service life of the frame is decreased.

Preferably, the main beam is arranged in parallel to the rear girder segments of the two girders, and a supporting block is fixed between the tiller and the connecting bar. The arrangement of the main beam in parallel to the rear girder segments makes the machining of the girders more convenient and makes the manufacturing, machining and assembly of the frame more convenient, and also makes the stability of the frame better. The arrangement of the supporting block is convenient for the fixation of the tiller and provides support to the tiller which is arranged obliquely to increase the strength of the tiller.

Preferably, a fixed block is fixed on a lower side of the main crossbeam; the height of a lower end face of a front end of the main beam is lower than the height of a lower end face of the main crossbeam; a rear end face of the fixed block is joined with a front end face of the main beam; one movable bar is hinged to each of left and right sides of the fixed block; and there are two front wheel bars to each of which a front end of each movable bar is fixed. The weld between the rear side of the fixed block and the lower side of the main crossbeam, the weld between the lower side of the front end of the main beam and the lower side of the rear end of the main crossbeam, and the beam between the rear side of the fixed block and the lower side of the front end of the main beam are a same weld, so that the structure of the frame is more stable and the strength of the frame is better; meanwhile, the arrangement of the movable bar optimizes the stress distribution of the front suspended shock absorption system, realizes more uniform stress distribution in various parts of the frame, and greatly decreases the leverage of factor in the torque transfer from the front suspended shock absorption system to the frame. Shock absorbers on the left front wheel and the right front wheel in the present invention are independent of each other. In this way, the scooter of the present invention can be used on bumpy roads or in areas with poor conditions. Thus, the use range of the scooter of the present invention is not limited to well-paved roads, for example, on community roads.

Preferably, a rotating shaft sleeve is fixed at a rear end of each of the movable bars, an articulating shaft is fixed on the fixed block, the rotating shaft sleeve is sheathed on the articulating shaft, and the rotating shaft sleeves of the two movable bars are independent of each other; there is an included angle formed between an axis of each of the movable bars and an axis of the main beam; the movable bar is of an inclined structure which extends outward from back to front; and a front end of the movable bar is fixed to an inner end of the front wheel bar. The oblique arrangement of the movable bars can avoid the interference with the articulating shaft. The outer side of the movable bar which is on the left side is called the left side, and the outer side of the movable bar which is on the right side is called the right side.

Preferably, a number of oil holes are formed on a lower tube wall of the rotating shaft tube, by which solid lubricating oil is filled into the rotating shaft tube. The up-down swinging distance of the front end of the movable bar is limited, and the rotation angle of the movable bar relative to the rotating shaft tube is limited. Forming the oil holes on the lower side of the rotating shaft tube is convenient to inject oil. And, in this way, the solid lubricating oil is less likely to leak from the oil holes.

Preferably, a fixed plate having an upper portion fixed to a front end face of the main crossbeam and a lower portion fixed to a front end face of the fixed block is provided on a front side of the main crossbeam; and the front end face of the fixed block and the front end face of the main crossbeam are in a same plane. The fixed plate is used for increasing the structural strength of the main crossbeam and the fixed block.

The present invention has the advantages that the structural strength of the frame is increased, the concentration points of stress are reduced, the service life of the scooter is increased, the structure of the scooter frame is simplified, the stress distribution of the shock absorption system is optimized, and the comfort during the use of the scooter of the present invention is improved.

DETAILED DESCRIPTION OF THE INVENTION

The present invention will be further described below by specific embodiments with reference to the accompanying drawings.

Figure 1:
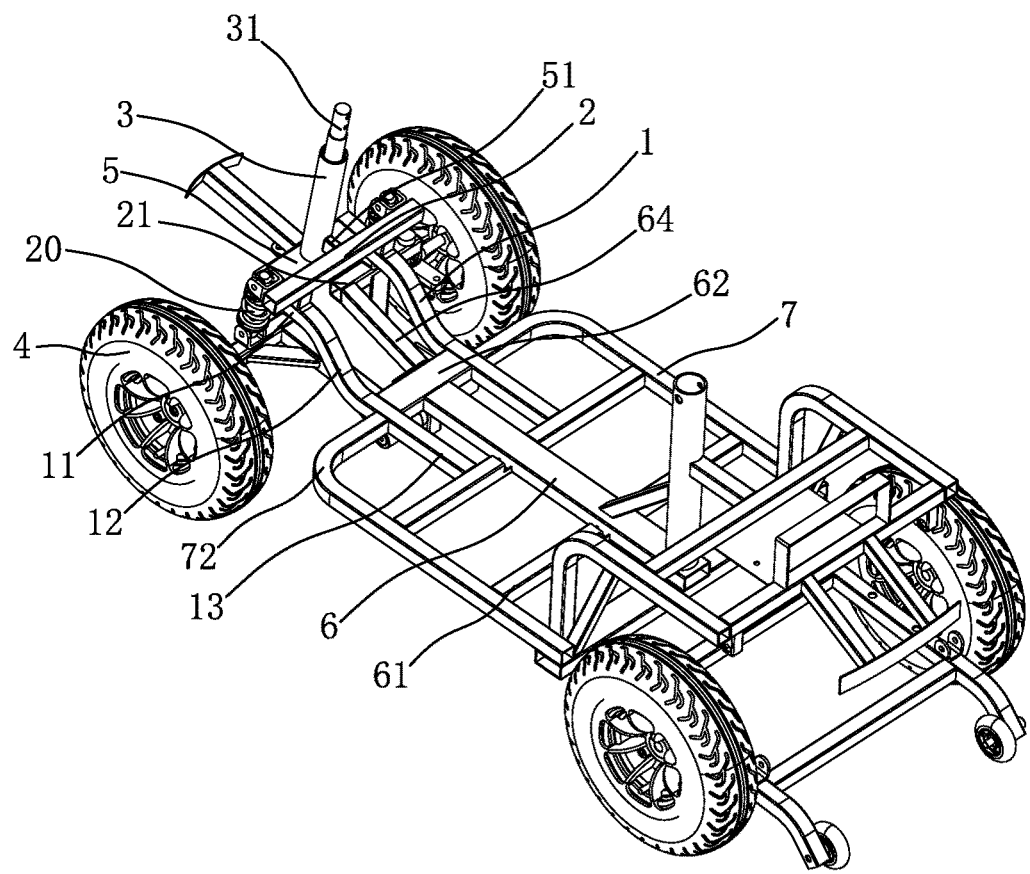
FIG. 1 is an axial side view of a frame according to the present invention.
Figure 2:
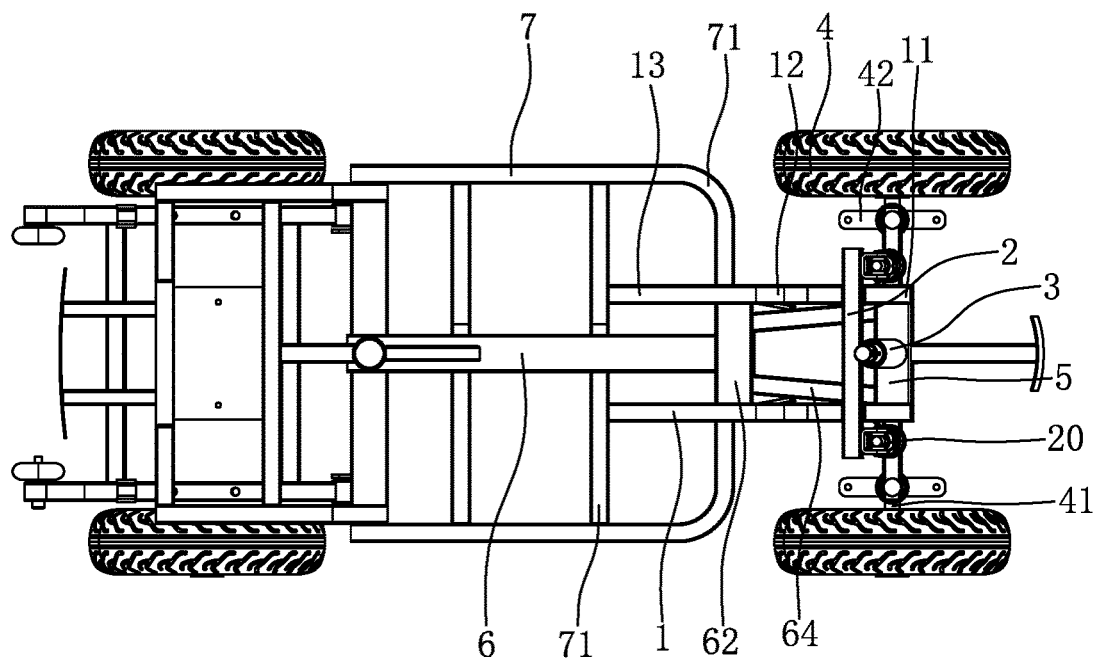
FIG. 2 is a top view of the frame according to the present invention.
Figure 3:
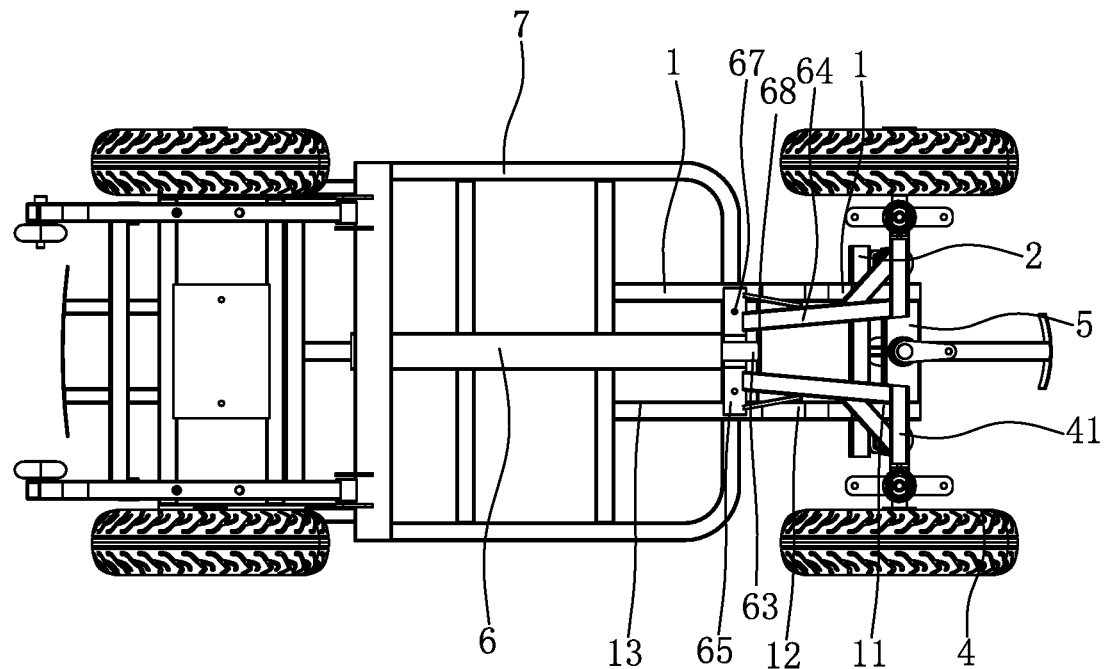
FIG. 3 is a bottom view of the frame according to the present invention.
Figure 4:
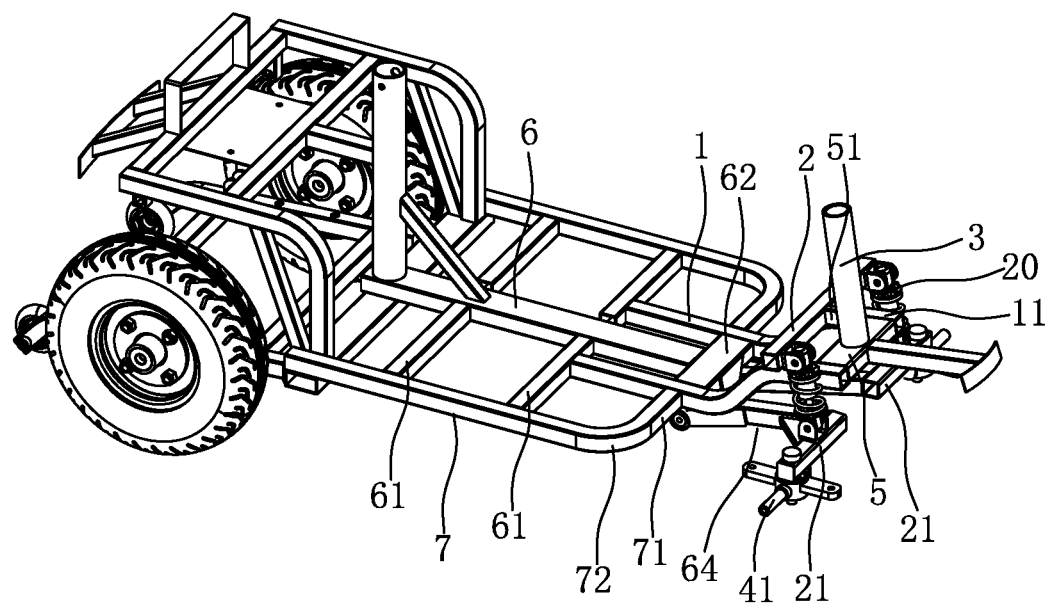
FIG. 4 is a structural diagram of the frame according to the present invention, with the front wheels and the front wheel steering system are removed.
Figure 5:
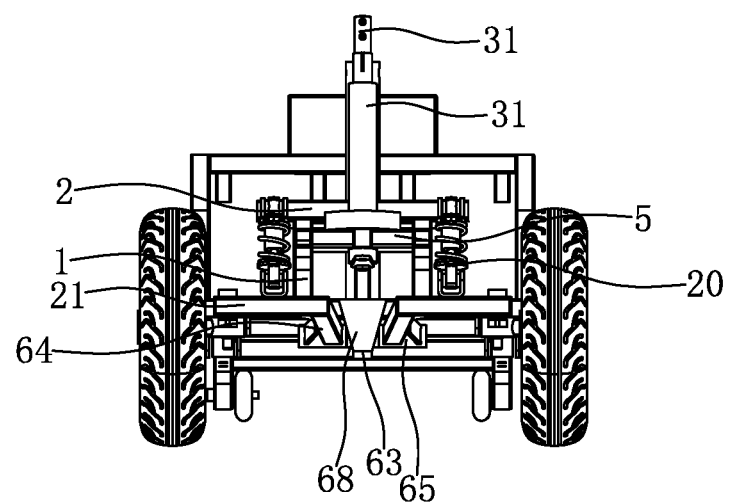
FIG. 5 is a front view of the present invention.

As shown in FIGS. 1-5, the present invention discloses an double-bend double-girder structure for a scooter; a frame of the scooter includes a frame body; at a front end of the frame body, two girders 1 arranged longitudinally in a front-rear direction, a mandrel 2 arranged transversely in a left-right direction and fixed to the girders, and a tiller 3 arranged vertically are provided; one shock absorber 20 is fixed to each of left and right ends of the mandrel 2, and a lower end of the shock absorber 20 is fixed to a front wheel bar 21, an outer end of which is fixed to a front wheel 4; a steering shaft 31 is provided within the tiller 3, an operating bibcock (not shown) is fixed at an upper end of the steering shaft 31, and a lower end of the steering shaft 31 is linked to a front wheel axle 41 via a linkage mechanism; each front wheel 4 is fixed on a front wheel axle 41; and a traction block 42 for driving the left or right rotation of a front wheel is provided on each of front and rear sides of the front wheel axle 41, and connecting rods in the linkage mechanism are connected to the traction blocks 42.

Each of the girders 1 consists of a front girder segment 11, a middle girder segment 12 and a rear girder segment 13. The front girder segment 11 is relatively located above the rear girder segment 13, and the middle girder segment 12 is arranged between the front girder segment 11 and the rear girder segment 12. The middle girder segment 12 is arranged in an arc shape so that the girder 1 forms an S-shaped structure. The girder is obtained from a straight tube by a bending device.

The mandrel 2 is fixed above a front girder segment 11 of a girder 1 and the mandrel 2 is deviated from a front end of the front girder segment 11; a connecting bar 5 is fixed between front ends of two front girder segments 11; the tiller 3 is fixed to the middle portion of the connecting bar 5; and a lower end of the steering shaft 3 passes through the connecting bar 5 to extend to below a lower end face of the connecting bar 5. A supporting block 51 is fixed between the tiller 3 and the connecting bar 5.

The frame body includes one main beam 6 arranged longitudinally in a front-rear direction and side beams 7 located on left and right sides of the main beam 6, with a plurality of connecting beams 61 fixed between the side beams 7 and the main beam 6; a main crossbeam 62 is fixed at a front end of the main beam 6; a rear end of the rear girder segment 13 is fixed to a connecting beam 61; and left and right ends of the main crossbeam 62 are fixed to the rear girder segment 13 of a girder 1, respectively. A front end of each of the side beams 7 is bent and extended inward to form a front side beam segment 71, an end of the front side beam segment 71 away from the side beam 7 is fixed to the rear girder segment 13, and an arc-shaped bending structure 72 is formed between the front side beam segment 71 and the side beam 7. The main beam 6 is arranged in parallel to the rear girder segments 13 of the two girders 1.

A fixed block 63 is fixed on a lower side of the main crossbeam 62; the height of a lower end face of a front end of the main beam 6 is lower than the height of a lower end face of the main crossbeam 62; a rear end face of the fixed block 63 is joined with a front end face of the main beam 6; one movable bar 64 is hinged to each of left and right sides of the fixed block 63; and there are two front wheel bars 21 to each of which a front end of each movable bar 64 is fixed. A rotating shaft tube 65 is fixed at a rear end of each of the movable bars 64, an articulating shaft is fixed on the fixed block 63, the rotating shaft tube 65 is sheathed on the articulating shaft, and the rotating shaft tubes 65 of the two movable bars 64 are independent of each other; there is an included angle formed between an axis of each of the movable bars 64 and an axis of the main beam 6; the movable bar 64 is of an inclined structure which extends outward from back to front; and a front end of the movable bar 64 is fixed to an inner end of the front wheel bar 21. An oil hole 67 is formed on a lower tube wall of the rotating shaft tube 65, by which solid lubricating oil is injected into the rotating shaft tube 65. A fixed plate 68 having an upper portion fixed to a front end face of the main crossbeam 62 and a lower portion fixed to a front end face of the fixed block 63 is provided on a front side of the main crossbeam 62; and the front end face of the fixed block 63 and the front end face of the main crossbeam 62 are in a same plane.

The present invention has the advantages that the structural strength of the frame is increased, the concentration points of stress are reduced, the service life of the scooter is increased, the structure of the scooter frame is simplified, the stress distribution of the shock absorption system is optimized, and the comfort during the use of the scooter of the present invention is improved.

The invention claimed is:

1. A double-bend double-girder structure for a scooter, characterized in that a frame comprises a frame body; at a front end of the frame body, two girders arranged longitudinally in a front-rear direction, a mandrel arranged transversely in a left-right direction and fixed to the girders, and a tiller arranged vertically are provided; one shock absorber is fixed to each of left and right ends of the mandrel, and a lower end of the shock absorber is fixed to a front wheel bar, an outer end of the front wheel bar is fixed to a front wheel; and each of the girders consists of a front girder segment, a middle girder segment and a rear girder segment, the front girder segment being relatively located above the rear girder segment, and the middle girder segment being arranged between the front girder segment and the rear girder segment, characterized in that the middle girder segment is arranged in an arc shape so that the girder forms an S-shaped structure.

2. The double-bend double-girder structure for a scooter according to claim 1, characterized in that the mandrel is fixed above a front girder segment of a girder and the mandrel is deviated from a front end of the front girder segment; a connecting bar is fixed between front ends of two front girder segments; the tiller is fixed to the middle portion of the connecting bar; and a steering shaft is provided within the tiller to steer a front wheel, and a lower end of the steering shaft passes through the connecting bar to extend to below a lower end face of the connecting bar.

3. A double-bend double-girder structure for a scooter, characterized in that a frame comprises a frame body; at a front end of the frame body, two girders arranged longitudinally in a front-rear direction, a mandrel arranged transversely in a left-right direction and fixed to the girders, and a tiller arranged vertically are provided; one shock absorber is fixed to each of left and right ends of the mandrel, and a lower end of the shock absorber is fixed to a front wheel bar, an outer end of the front wheel bar is fixed to a front wheel; and each of the girders consists of a front girder segment, a middle girder segment and a rear girder segment, the front girder segment being relatively located above the rear girder segment, and the middle girder segment being arranged between the front girder segment and the rear girder segment, characterized in that the mandrel is fixed above the front girder segment of one of the girders and the mandrel is deviated from a front end of the front girder segment; a connecting bar is fixed between front ends of two front girder segments; the tiller is fixed to the middle portion of the connecting bar; and a steering shaft is provided within the tiller to steer a front wheel, and a lower end of the steering shaft passes through the connecting bar to extend to below a lower end face of the connecting bar.

4. The double-bend double-girder structure for a scooter according to claim 3, characterized in that the frame body comprises one main beam arranged longitudinally in a front-rear direction and side beams located on left and right sides of the main beam, with a plurality of connecting beams fixed between the side beams and the main beam; a main crossbeam is fixed at a front end of the main beam; a rear end of the rear girder segment is fixed to a connecting beam; and left and right ends of the main crossbeam are fixed to the rear girder segment of a girder, respectively.

5. The double-bend double-girder structure for a scooter according to claim 4, characterized in that a front end of each of the side beams is bent and extended inward to form a front side beam segment, an end of the front side beam segment away from the side beam is fixed to the rear girder segment, and an arc-shaped bent structure is formed between the front side beam segment and the side beam.

6. The double-bend double-girder structure for a scooter according to claim 4, characterized in that the main beam is arranged in parallel to the rear girder segments of the two girders, and a supporting block is fixed between the tiller and the connecting bar.

7. The double-bend double-girder structure for a scooter according to claim 4, characterized in that a fixed block is fixed on a lower side of the main crossbeam; the height of a lower end face of a front end of the main beam is lower than the height of a lower end face of the main crossbeam; a rear end face of the fixed block is joined with a front end face of the main beam; one movable bar is articulated to each of left and right sides of the fixed block; and there are two front wheel bars to each of which a front end of each movable bar is fixed.

8. The double-bend double-girder structure for a scooter according to claim 7, characterized in that a rotating shaft tube is fixed at a rear end of each of the movable bars, an articulating shaft is fixed on the fixed block, the rotating shaft tube is sheathed on the articulating shaft, and the rotating shaft tubes of the two movable bars are independent of each other; there is an included angle formed between an axis of each of the movable bars and an axis of the main beam; the movable bar is of an inclined structure which extends outward from back to front; and a front end of the movable bar is fixed to an inner end of the front wheel bar.

9. The double-bend double-girder structure for a scooter according to claim 8, characterized in that a number of oil holes are formed on a lower tube wall of the rotating shaft tube, by which solid lubricating oil is injected into the rotating shaft tube.

10. The double-bend double-girder structure for a scooter according to claim 7, characterized in that a fixed plate having an upper portion fixed to a front end face of the main crossbeam and a lower portion fixed to a front end face of the fixed block is provided on a front side of the main crossbeam; and the front end face of the fixed block and the front end face of the main crossbeam are in a same plane.

* * * * *